United States Patent
Romanov

(10) Patent No.: US 9,322,688 B2
(45) Date of Patent: Apr. 26, 2016

(54) METHOD FOR PASSING SIGNALS THROUGH A MEDIUM UNDER MONITORING

(76) Inventor: Yuriy I. Romanov, Novosibirsk (RU)

( * ) Notice: Subject to any disclaimer, the term of this patent is extended or adjusted under 35 U.S.C. 154(b) by 0 days.

(21) Appl. No.: 13/261,938

(22) PCT Filed: Feb. 7, 2012

(86) PCT No.: PCT/RU2012/000070
§ 371 (c)(1),
(2), (4) Date: Aug. 7, 2014

(87) PCT Pub. No.: WO2013/119135
PCT Pub. Date: Aug. 15, 2013

(65) Prior Publication Data
US 2015/0139288 A1    May 21, 2015

(51) Int. Cl.
*G01F 1/66* (2006.01)

(52) U.S. Cl.
CPC . *G01F 1/66* (2013.01); *G01F 1/667* (2013.01)

(58) Field of Classification Search
CPC .............. G01F 1/00; G01F 1/667; G01F 1/66
See application file for complete search history.

(56) References Cited

U.S. PATENT DOCUMENTS

| | | | | |
|---|---|---|---|---|
| 4,011,753 A * | 3/1977 | Hausler | G01P 5/245 73/861.28 |
| 4,183,244 A * | 1/1980 | Kohno | G01F 1/667 73/861.26 |
| 4,334,431 A * | 6/1982 | Kohno | G01B 17/00 73/597 |
| 5,440,936 A * | 8/1995 | Spani | A61B 8/06 600/455 |
| 6,055,868 A * | 5/2000 | Koyano | G01F 1/667 73/861.28 |
| 6,925,891 B2 * | 8/2005 | Suginouchi | G01F 1/667 73/861.27 |
| 7,117,104 B2 * | 10/2006 | Urdaneta et al. | 702/48 |
| 7,568,398 B2 * | 8/2009 | Feller | G01F 1/667 73/861.29 |
| 7,617,738 B2 * | 11/2009 | Sakai | G01F 1/66 73/861.27 |
| 2003/0190899 A1 * | 10/2003 | Nicollini et al. | 455/138 |
| 2003/0200817 A1 * | 10/2003 | Suginouchi et al. | G01F 1/667 73/861.23 |
| 2005/0072248 A1 * | 4/2005 | Suginouchi et al. | 73/861.27 |

* cited by examiner

*Primary Examiner* — Sophia Vlahos
(74) *Attorney, Agent, or Firm* — Patentagar PLLC; Alexander Rabinovich

(57) ABSTRACT

The method for passing signals through a medium under monitoring consists in generating a reference signal, transmitting this reference signal in a forward direction through the medium under monitoring by means of at least one transmitting electrical circuit, receiving the signal passing in the forward direction through the medium under monitoring by means of at least one receiving electrical circuit, transmitting the generated reference signal in the reverse direction through the medium under monitoring by means of the at least one receiving electrical circuit, receiving the signal passing in the reverse direction through the medium under monitoring by means of the at least one transmitting electrical circuit and thus ensuring the passage of signals through the medium under monitoring. The method for passing signals through a medium under monitoring ensures the production of signals passing through the medium under monitoring which have a high degree of identity.

1 Claim, 3 Drawing Sheets

METHOD FOR PASSING SIGNALS THROUGH A MEDIUM UNDER MONITORING

The proposed technology relates to measuring technique and can be used for measuring signals passing through a controlled medium in a pipeline. Providing measurements of a higher degree of identity, it increases the accuracy of measuring parameters of the controlled medium in a pipeline.

Known in the prior art is USSR Author's Certificate No. 1026015 which comprises the following aggregation of essential limitations:
  generating an original ultrasonic signal,
  transmitting the generated original ultrasonic signal in a forward direction through a controlled medium in a pipeline over at least one first electric circuit;
  receiving the ultrasonic signal which has passed through the controlled medium in the forward direction in the pipeline over the at least one first electric circuit;
  transmitting the generated original ultrasonic signal in an opposite direction through the controlled medium in the pipeline over at least one second electric circuit;
  receiving the ultrasonic signal which has passed through the controlled medium in the opposite direction in the pipeline over the at least one second electric circuit;

What this prior art publication and the proposed technology have in common is:
  generating an original signal;
  transmitting the generated original signal in a forward direction through a controlled medium over at least one electric circuit;
  receiving the signal which has passed through the controlled medium in the forward direction over at least one electric circuit;
  transmitting the generated original signal in the opposite direction through the controlled medium;
  receiving the signal which has passed through the controlled medium in the opposite direction;

Also known is a similar technology presented by V. P. Derevenchook, E. G. Savin, et al. with regard to a multiphase flow meter for oil production (Proceedings of the conference "Modern technologies of hydrodynamic well analysis at all stages of deposit development." Tomsk, May 13-15, 2008), which implements a method of passing radio signals through a controlled medium, comprising the steps of:
  generating an original radio signal;
  transmitting the generated original radio signal in a forward direction through the controlled medium over at least one electric circuit;
  receiving the signal which has passed in the forward direction through the controlled medium over at least one electric circuit;
  transmitting the generated original radio signal in an opposite direction through the controlled medium over at least another electric circuit; and
  receiving the signal which has passed in the opposite direction through the controlled medium over at least another electric circuit.

What this prior art publication and the proposed technology have in common is:
  generating an original signal;
  transmitting the generated original signal in the forward direction through the controlled media over at least one electric circuit;
  receiving the signal which has passed in the forward direction through the controlled medium over at least one electric circuit;
  transmitting the generated original signal in the opposite direction through the controlled medium; and
  receiving the signal which has passed in the opposite direction through the controlled medium.

Believed to be the closest analog to the proposed technology is a technology (see a system FLOWSIC-100 at www.k-tkprom.ru) comprising a method of passing signals through a controlled media, the method providing:
  generating an original ultrasonic signal;
  transmitting the generated original ultrasonic signal in a forward direction through a controlled medium over at least one electric circuit;
  receiving the ultrasonic signal that has passed in the forward direction through the controlled medium in a pipeline over at least one electric circuit;
  transmitting the generated original ultrasonic signal in an opposite direction through the controlled medium in the pipeline over at least another electric circuit; and
  receiving the ultrasonic signal that has passed in the opposite direction through the controlled medium in a pipeline over at least one electric circuit.

The proposed technology and the closest analog have the following common features:
  generating an original signal;
  transmitting the generated original signal in a forward direction through a controlled medium over at least one electric circuit;
  receiving the signal that has passed in the forward direction through the controlled medium over at least one electric circuit;
  transmitting the generated original signal in an opposite direction through the controlled medium; and
  receiving the signal that has passed in the opposite direction through the controlled medium.

The technical result that can be achieved in neither of the above-mentioned prior art is to rule out the exertion of electronic component mismatch on the process of passing ultrasonic, radio, and other similar signals over electric circuits, whereby highly identical signals can be used for passing through the controlled medium in a pipeline.

Lying behind the impossibility of achieving that result in prior art is providing different circuits, which comprise of different electronic components, for passing ultrasonic, radio, and other signals, mismatching of those components exerting substantial influence on the passing of ultrasonic, radio, and other signals and on electric signal parameters since there is no even two electronic components of one type that would have identical parameters.

With prior art analogous technology in view, it is believed that it is a topical task today to rule out the exertion of electronic component mismatch on the process of passing various signals over electric circuits, and, as a result, to provide highly identical signals that have passed through a controlled medium in a pipeline.

The above-mentioned technical result is arrived at by providing a method of passing signals through a controlled medium, the method comprising the steps of generating an original signal, transmitting the generated original signal in a forward direction through a controlled medium over at least one electric circuit, receiving the signal which has passed in the forward direction through the controlled medium, transmitting the generated original signal in an opposite direction through the controlled medium over at least one electric circuit, and receiving the signal which has passed in the opposite direction through the controlled medium, the steps of transmitting the generated original signal in the opposite direction and receiving the signal which has passed in the opposite direction through the controlled medium being carried out over same electric circuits used for transmitting and receiving signals in the forward direction.

Transmitting the generated original signal (be it a radio, ultrasonic or other signal) in the forward and opposite direction (in and counter a flow direction) and receiving the signals that have passed through the controlled medium, as stated above, over same electric circuits secures passing the original signal immune to electronic component parameter mismatching that results in attaining a high degree of identity, to thereby allow to achieve measuring a volume flow rate in a pipeline with high precision, which thus shows arriving at the above-mentioned technical result.

Reviewing prior art publications failed to locate any of them that would comprise the whole aggregation of prior art features and characteristic features of the proposed technology which warrants coming to the conclusion of its meeting the criteria of novelty and inventive level.

The technical substance of the proposed method of passing signals through a controlled medium lies in the following:
   generating an original signal;
   transmitting the generated original signal in a forward direction through a controlled medium over at least one (transmitting) electric circuit;
   receiving the signal, which has passed in the forward direction through the controlled medium, from at least one (receiving) electric circuit;
   transmitting the generated original signal in an opposite direction through a controlled medium over the at least one (receiving) electric circuit;
   receiving the signal, which has passed in the opposite direction through the controlled medium, from the at least one (transmitting) electric circuit.

The proposed method of passing signals through a controlled medium is set forth in the ensuing description with a reference to accompanying drawings in which.

Figure 1:
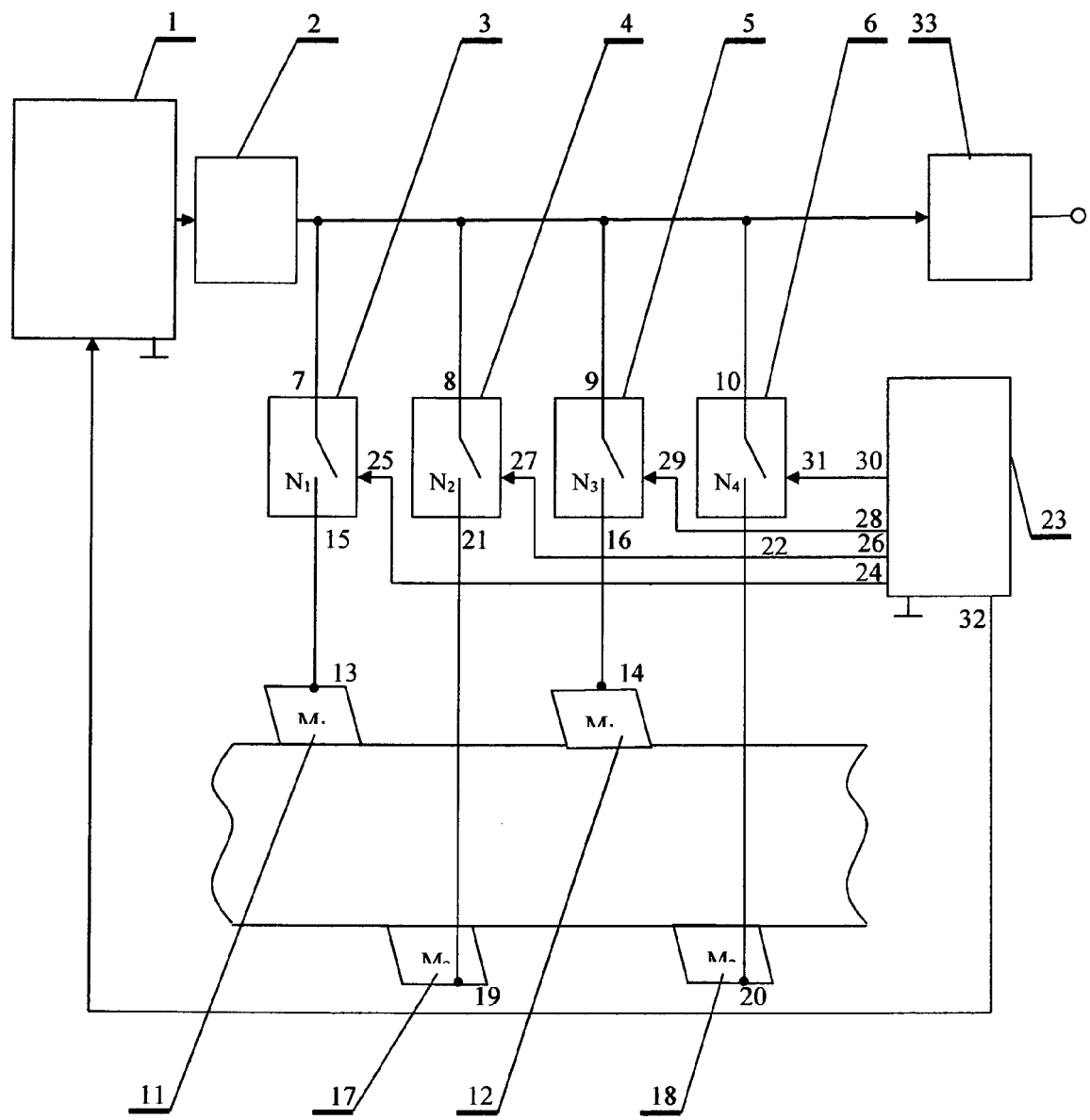
FIG. 1 is a schematics of an example of implementing the proposed method of passing signals through a controlled medium in an apparatus for passing ultrasonic signals through a controlled medium in a pipeline.

The apparatus of passing ultrasonic signals through a controlled media in a pipeline which illustrates the proposed method comprises:
   an ultrasonic signal generator 1;
   a decoupler 2 whose input is connected to an output of the generator 1;
   gate circuits—first 3 ($N_1$), second 4 ($N_2$), third 5 ($N_3$), and fourth 6 ($N_4$) connected by their first ports 7, 8, 9, and 10, respectively, to an output of the decoupler 2;
   ultrasonic piezoelectric transducers $M_1$: first $M_1$ 11 and second $M_1$ 12 mounted on a pipeline with a controlled medium and connected by their respective ports 13 and 14 to respective second ports 15 and 16 of the gate circuits 3 and 5, i.e. the port 13 of the first ultrasonic piezoelectric transducer $M_1$ 11 is connected to the second port 15 of the first gate circuit 3, and the port 14 of the second ultrasonic piezoelectric transducer $M_1$ 12 is connected to the second port 16 of the third gate circuit 5;
   ultrasonic piezoelectric transducers $M_2$: third $M_2$ 17 and fourth $M_2$ 18 mounted on a pipeline with a controlled medium and connected by their respective ports 19 and 20 to respective second ports 21 and 22 of the gate circuits 4 and 6, i.e. the port 19 of the third ultrasonic piezoelectric transducer $M_2$ 17 is connected to the second port 21 of the second gate circuit 4, and the port 20 of the fourth ultrasonic piezoelectric transducer $M_2$ 18 is connected to the second port 22 of the fourth gate circuit 6;
   a control unit 23 connected by its respective outputs to control ports of the respective gate circuits $N_1$-$N_4$, i.e. a first output 24 of the control unit 23 is connected to a control port 25 of the first gate circuit 3, a second output 26 of the control unit 23 is connected to a control port 27 of the second gate circuit 4, a third output 28 of the control unit 23 is connected to a control port 29 of the third gate circuit 5, and a fourth output 30 of the control unit 23 is connected to a control port 31 of the fourth gate circuit 6; whereas a fifth output 32 of the control unit 23 is connected to an input of the generator 1 of ultrasonic signals;
   an amplifier 33 is connected by its input to the output of the decoupler 2.

Figure 2:
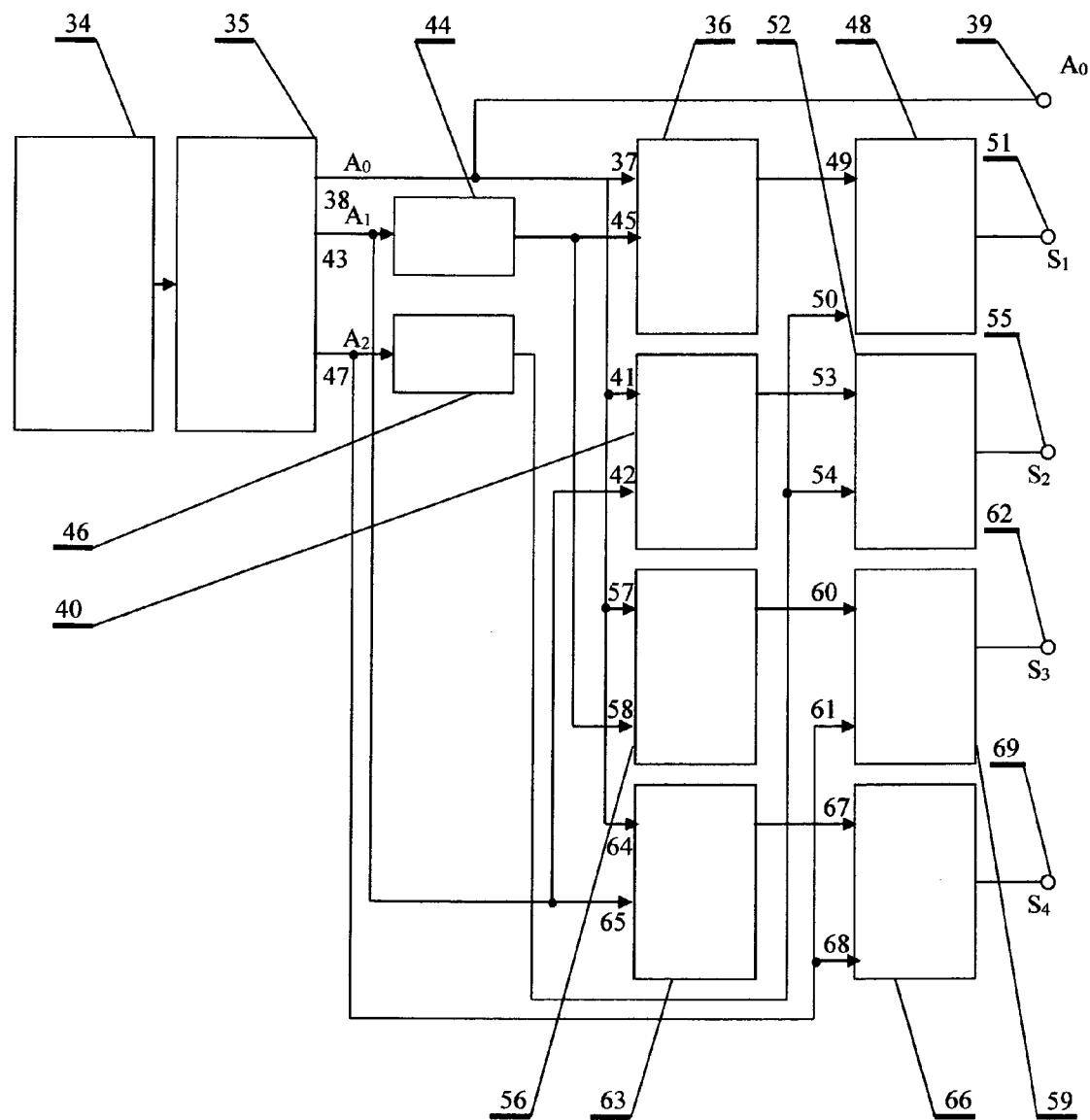
FIG. 2 is a schematics of a control unit from FIG. 1.

The control unit 23 presented in FIG. 2 comprises:
   a rectangular pulse shaper 34;
   a strobe pulse former 35 connected by its input to an output of the rectangular pulse shaper 34;
   a first EXCLUSIVE OR circuit 36 connected by its first input 37 to a first output 38 of the strobe pulse former 35 which is connected via its port 39 (the fifth output of the control unit 23) to the input of the generator 1 of ultrasonic signals;
   a second EXCLUSIVE OR circuit 40 connected by its first input 41 to a first output 38 of the strobe pulse former 35 and by its second input 42—to a second output 43 of the strobe pulse former 35;
   a first inverter 44 connected by its input to the second output 43 of the strobe pulse former 35, and by its output—to a second input 45 of the first EXCLUSIVE OR circuit 36;
   a second inverter 46 connected by its input to a third output 47 of the strobe pulse former 35;
   a first AND circuit 48 connected by its first input 49 to the output of the first EXCLUSIVE OR circuit 36, by its second input 50 to the output of the second inverter 46, and by its output 51 to a control input 25 of the first gate circuit 3;
   a second AND circuit 52 connected by its first input 53 to the output of the second EXCLUSIVE OR circuit 40, by its second input 54 to the output of the second inverter 46, and by its output 55 to a control input 27 of the second gate circuit 4;
   a third EXCLUSIVE OR circuit 56 connected by its first input 57 to a first output 38 of the strobe pulse former 35 and by its second input 58—to the output of the first inverter 44;
   a third AND circuit 59 connected by its first input 60 to the output of the third EXCLUSIVE OR circuit 56, by its second input 61 to the third output 47 of the strobe pulse former 35, and by its output 62 to a control input 29 of the third gate circuit 5;
   a fourth EXCLUSIVE OR circuit 63 connected by its first input 64 to a first output 38 of the strobe pulse former 35 and by its second input 65—to the second output 43 of the strobe pulse former 35;
   a fourth AND circuit 66 connected by its first input 67 to the output of the fourth EXCLUSIVE OR circuit 63, by its second input 68 to the third output 47 of the strobe pulse former 35, and by its output 69 to a control input 31 of the fourth gate circuit 6.

The ultrasonic signal generator can include the ultrasonic signal generator disclosed in the Russian patent No. 2367912.

The decoupler 2 can include a buffer amplifier described in U. Tietze and Ch. Schenk, "Electronic Circuits: Handbook for Design and Application" (Russian translation, Moscow, Mir, 1982, p.76).

The rectangular pulse shaper 34 can include an inverter flip-flop circuit disclosed in V. L. Shilo, "Popular Digital Microcircuits", Moscow, Radio and Telecommunications, 1987, p.218.

The strobe pulse former 35 can include a binary counter KP155414E10 described in "Logic ICs KP1533, 1554", Moscow, Binom, 1993, p.375.

All the other circuits that the apparatus of passing ultrasonic signals through a controlled media in a pipeline, which illustrates the proposed method, comprises are well known in the art and described in numerous publications on electronic and computer engineering.

Figure 3:
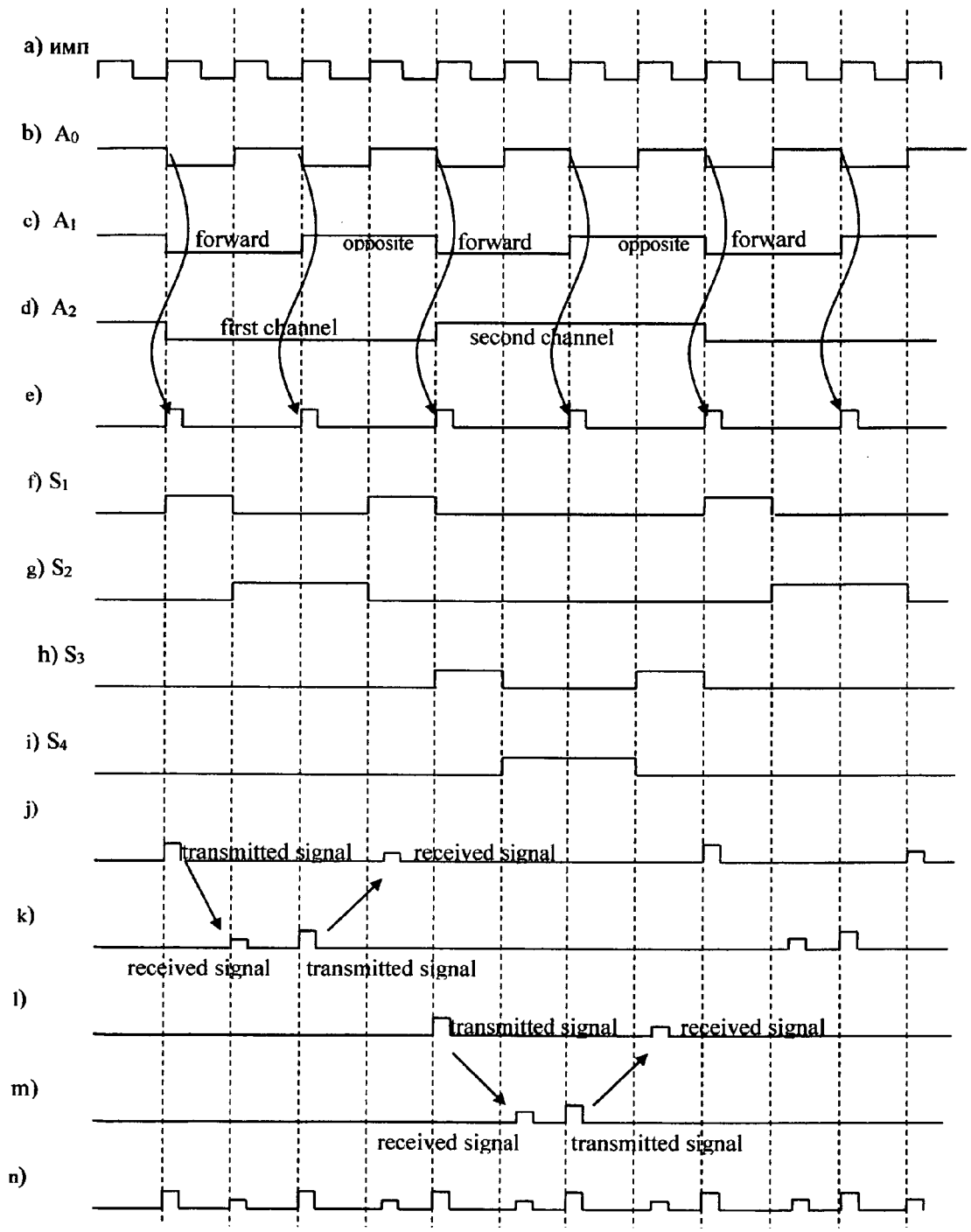
FIG. 3 are flow charts illustrating operation of the apparatus for passing ultrasonic signals through a controlled media in a pipeline.

Flow charts presented in FIG. 3 illustrating the operation of the apparatus of passing ultrasonic signals through a controlled media in a pipeline comprise:

A flow chart (a) of pulses at the output of the rectangular pulse shaper 34;

flow charts (b), (c), and (d) of pulses $A_0$, $A_1$, $A_2$ at the outputs of the strobe pulse former 35;

a flow chart (e) of ultrasonic signals at the output of the decoupler 2;

flow charts (f), (g), (h), and (i) of signals at the control ports 25, 27, 29, and 31 of the gate circuits 3, 4, 5, and 6, (f) being for the first gate circuit 3, (g) being for the second gate circuit 4, (h) being for the third gate circuit 5, and (i) being for the fourth gate circuit 6, the control signals $S_1$, $S_2$, $S_3$, and $S_4$ assigning time slots for passing ultrasonic signals through the controlled media in the pipeline in and counter direction of flow, at transmitting and receiving ultrasonic signals, via a first channel composed of the ultrasonic signal generator 1, decoupler 2, first gate circuit 3, first ultrasonic piezoelectric transducer 11, second ultrasonic piezoelectric transducer 17, second gate circuit 4, and amplifier 33, and via a second channel composed of the ultrasonic signal generator 1, decoupler 2, third gate circuit 5, third ultrasonic piezoelectric transducer 112, fourth ultrasonic piezoelectric transducer 18, fourth gate circuit 6, and amplifier 33;

flow charts (j), (k), (l), and (m) at ports of ultrasonic piezoelectric transducers 11, 12, 17, and 18 upon passing ultrasonic signals in and counter direction of flow of the controlled media in the pipeline for the first and second channels;

a flow chart (n) of ultrasonic signals at the output of the amplifier 33.

In operation of the apparatus for illustrating the method of passing ultrasonic signals through the controlled media in the pipeline, a control signal shaped as rectangular pulses at the output of the rectangular pulse shaper 34 (the flow chart (a)) comes to the input of the strobe pulse former 35. Generated at the first output 38 ($A_0$) of the strobe pulse former 35 are signals $A_0$, at the second output 43 ($A_1$) signals $A_1$, and at the third output 47 ($A_3$) signals $A_3$ (the flow charts (b), (c), and (d)).

Pulse signals $A_0$ come from the first output 38 of the strobe pulse former 35 to the first input 37 of the first EXCLUSIVE OR circuit 36 and to the port 39 (the fifth output 32 of the control unit 23), whereas pulse signals $A_1$ come from the second output 43 of the strobe pulse former 35, via the first inverter 44, to the second input 45 of the first EXCLUSIVE OR circuit 36. From the output of the circuit 36, pulse signals arrive at the first input 49 of the first AND circuit 48, while coming to the second input 50 of the circuit 48 from the third output 47 of the strobe pulse former 35 via the second inverter 46 are pulse signals "$\overline{A}_2$". After processing according to the equation $S_1 = (A_0 \oplus \overline{A}_1) \cdot \overline{A}_2$, where $A_0$ pulse signals at the first output 38 of the strobe pulse former 35, $\overline{A}_1$—inverted pulse signals from the second output 43 of the strobe pulse former 35, and $\overline{A}_2$—inverted pulse signals from the third output 47 of the strobe pulse former 35, signal $S_1$ (FIG. 3, the flow chart (f)) controlling the first gate circuit 3 is generated at the output of the first AND circuit 48 (port 51, the first output 24 of the control unit 23).

Pulse signals $A_0$ come from the first output 38 of the strobe pulse former 35 to the first input 41 of the second EXCLUSIVE OR circuit 40 as pulse signals $A_1$ come from the second output 43 of the strobe pulse former 35 to the second input 42 of the second EXCLUSIVE OR circuit 40, pulse signals from the output thereof being supplied to the first input 53 of the second AND circuit 52. Coming to the second input 54 of the second AND circuit 52 from the third output 47 of the strobe pulse former 35 via the second inverter 46 are pulse signals $\overline{A}_2$.

As a result and in the accordance with the equation $S_2 = (A_0 \oplus A_1) \cdot \overline{A}_2$, where $A_0$—pulse signals at the first output 38 of the strobe pulse former 35, $A_1$—pulse signals from the second output 43 of the strobe pulse former 35, and $\overline{A}_2$—inverted pulse signals from the third output 47 of the strobe pulse former 35, signal $S_2$ (FIG. 3, the flow chart (g)) controlling the second gate circuit 4 is generated at the output of the second AND circuit 52 (port 55, the first output 26 of the control unit 23).

Pulse signals $A_0$ come from the first output 38 of the strobe pulse former 35 to the first input 57 of the third EXCLUSIVE OR circuit 56, as pulse signals $\overline{A}_1$ from the second output 43 of the strobe pulse former 35 come via the first inverter 44 to the second input 58 of the third EXCLUSIVE OR circuit 56, pulse signals from the output thereof being supplied to the first input 60 of the third AND circuit 59. Coming to the second input 61 of the third AND circuit 59 from the third output 47 of the strobe pulse former 35 are pulse signals $A_2$.

As a result and in the accordance with the equation $S_3 = (A_0 \oplus \overline{A}_1) \cdot A_2$, where $A_0$—pulse signals at the first output 38 of the strobe pulse former 35, $\overline{A}_1$ inverted pulse signals from the second output 43 of the strobe pulse former 35, and $A_2$—pulse signals from the third output 47 of the strobe pulse former 35, signal $S_3$ (FIG. 3, the flow chart (h)) controlling the third gate circuit 5 is generated at the output of the third AND circuit 59 (port 62, the third output 28 of the control unit 23).

Also, pulse signals $A_0$ come from the first output 38 of the strobe pulse former 35 to the first input 64 of the fourth EXCLUSIVE OR circuit 63, as pulse signals $A_1$ from the second output 43 of the strobe pulse former 35 to the second input 65 of the fourth EXCLUSIVE OR circuit 63, pulse signals from the output thereof being supplied to the first input 67 of the fourth AND circuit 66. Coming to the second input 68 of the fourth AND circuit 66 from the third output 47 of the strobe pulse former 35 are pulse signals $A_2$.

As a result and in the accordance with the equation $S_4 = (A_0 \oplus A_1) \cdot A_2$, where $A_0$—pulse signals at the first output 38 of the strobe pulse former 35, $A_1$ pulse signals at its second output 43, and $A_2$—pulse signals at its third output 47, signal $S_4$ (FIG. 3, the flow chart (i)) controlling the fourth gate circuit 6 is generated at the output of the fourth AND circuit 66 (port 69, the fourth output 30 of the control unit 23).

When control signals from the fifth output 32 (port 39) of the control unit 23 arrive at the input of the ultrasonic signal generator 1, the generator 1 provides short "probe" pulses (FIG. 3, the flow chart (e)) which pass through the decoupler 2 that amplifies them and secure matching the generator 1 output impedance with input impedance of the first-fourth gate circuits 3-6 and that of the amplifier 33.

In accordance with the control signal $S_1$, coming from the first output 24 (port 51) of the control unit 23 to the control input 25 of the first gate circuit 3, contacts of the first gate circuit 3 close, and the "probe" signal arrives at the port 13 of the first ultrasonic piezoelectric transducer 11. The first ultrasonic piezoelectric transducer 11 transforms the short "probe" signal into ultrasonic signals (FIG. 3, the flow charts (j) and (k)) and sends them in the direction of the controlled media flow in the pipeline toward the second ultrasonic piezoelectric transducer 17. Upon that, the control signal at the first output 24 of the control unit 23 is taken off from the control input 25 of the first gate circuit 3, and the contacts of the first gate circuit 3 open.

Then, the control signal $S_2$ from the second output 26 (port 55) of the control unit 23 arrives at the control input 27 of the second gate circuit 4. It closes contacts of the second gate circuit 4 and secures supplying the electric signal resulting from the transformation by the second ultrasonic piezoelectric transducer 17 of the ultrasonic signals, which passed in the direction of the controlled media flow in the pipeline, to the input of the amplifier 33 and then, via the amplifier 33, to the output of the apparatus for passing ultrasonic signals through the controlled media in the pipeline (FIG. 3, the flow chart (n)).

After that, in accordance with the control signal coming from the fifth output 32 (port 39) of the control unit 23 to the input of the ultrasonic signal generator 1, the next "probe" signal (FIG. 3, the flow chart (e)) is generated by the ultrasonic signal generator 1 to go via closed contacts of the second gate circuit 4 to the second ultrasonic piezoelectric transducer 17. The second ultrasonic piezoelectric transducer 17 transforms the "probe" signal into ultrasonic signals (FIG. 3, flow charts (j) and (k)) and sends them counter the direction of the controlled media flow in the pipeline toward the first ultrasonic piezoelectric transducer 11. Upon that, the control signal at the second output 26 of the control unit 23 is taken off from the control input 27 of the second gate circuit 4, and the contacts of the second gate circuit 4 open.

Then, the control signal $S_1$ from the first output 24 (port 51) of the control unit 23 arrives at the control input 25 of the first gate circuit 3. It closes contacts of the first gate circuit 3 and secures supplying the electric signal resulting from the transformation by the first ultrasonic piezoelectric transducer 11 of the ultrasonic signals, which passed counter the direction of the controlled media flow in the pipeline, to the input of the amplifier 33 and then, via the amplifier 33, to the output of the apparatus for passing ultrasonic signals through the controlled media in the pipeline (FIG. 3, the flow chart (n)).

Discussed in the above is how the apparatus for passing ultrasonic signals through the controlled media in the pipeline operates in the first channel in and counter the direction of the flow of the controlled media. The second channel operates in a similar way, the second channel time interval being shown in FIG. 3 at the flow chart (d), time intervals of ultrasonic signals passing in and counter the direction of the flow in the first and second channels being illustrated by the flow chart (c) in FIG. 3, whereas the flow chart (b) in FIG. 3 depicts the intervals in which receiving ultrasound signals that passed in and counter the flow of the controlled media in the first and second channels takes place.

The way the flow charts (j) and (k) illustrate passing ultrasonic signals in and counter the flow in the first channel, the flow charts (l) and (m) show passing ultrasonic signals in and counter the flow in the second channel.

An essential feature of the proposed method is passing ultrasonic signals, that eventually arrive to the input of the amplifier 33, in and counter the flow of the controlled media in the pipeline in the first and second channels through same electronic elements in each of the channels. This eliminates the problem of influencing those signals by mismatching parameters of the electronic elements.

It follows from the above discussion about the apparatus, implementing the proposed method of passing signals through a controlled media in a pipeline, that due to using same electrical circuits each time the generated signals pass in and counter flow of the controlled media in the pipeline, the influence of mismatching electronic component parameters on these signals is practically eliminated. This in turn contributes to enhancing precision of measurement when, for example, a volume flow rate of a controlled medium in a pipeline is measured.

What is claimed is:

1. A method of passing signals through a controlled media in a pipeline, comprising the steps of:
   generating an original signal;
   transmitting the generated original signal in a forward direction through the controlled media over at least one first transmitting electrical circuit, said first transmitting electrical circuit comprising a gate circuit in a first gate state when transmitting the generated original signal in the forward direction;
   receiving the signal that has passed in the forward direction through the controlled media over at least one first receiving electrical circuit;
   transmitting the generated original signal in an opposite direction through the controlled media over at least one second transmitting electrical circuit;
   receiving the signal that has passed in the opposite direction through the controlled media over at least one second receiving electrical circuit, said second receiving electrical circuit comprising the gate circuit in the first gate state when receiving the signal that has passed in the opposite direction;
   wherein said at least one first transmitting and first receiving electrical circuit transmitting the generated original signal and receiving it in a forward direction include said at least one second transmitting and second receiving electrical circuits transmitting the generated original signal and receiving it in an opposite direction;
whereby same electrical circuits are used each time the generated signals pass in the forward direction and the opposite direction of the controlled media in the pipeline, to thereby practically eliminate the influence of mismatching electronic component parameters on these signals.

* * * * *